C. H. WALLACE.
COMPUTING TABLE.
APPLICATION FILED MAR. 15, 1917.

1,298,267.

Patented Mar. 25, 1919.
4 SHEETS—SHEET 1.

Witness
Fenton S. Belt
J. N. Sherwood

Inventor
C. H. Wallace
By Franklin H. Hough
Attorney

C. H. WALLACE.
COMPUTING TABLE.
APPLICATION FILED MAR. 15, 1917.

1,298,267.

Patented Mar. 25, 1919.
4 SHEETS—SHEET 2.

Witness
Fenton S. Belt
J. W. Sherwood

Inventor
C. H. Wallace
By Franklin H. Hough
Attorney

Powers of 2.    Powers of 1/2.

C. H. WALLACE.
COMPUTING TABLE.
APPLICATION FILED MAR. 15, 1917.

1,298,267.

Patented Mar. 25, 1919.
4 SHEETS—SHEET 4.

Witnesses

Inventor
C. H. Wallace
Franklin H. Hough
Attorney

UNITED STATES PATENT OFFICE.

CLARENCE H. WALLACE, OF ST. HELENA, CALIFORNIA.

COMPUTING-TABLE.

1,298,267.   Specification of Letters Patent.   Patented Mar. 25, 1919.

Application filed March 15, 1917. Serial No. 155,017.

*To all whom it may concern:*

Be it known that I, CLARENCE H. WALLACE, a citizen of the United States, residing at St. Helena, in the county of Napa and State of California, have invented certain new and useful Improvements in Computing-Tables; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for use in multiplying and dividing numbers by addition, accomplished by the aid of pegs set in holes in the surface of a board or plate and adapted to represent the terms of a geometric series in which 2 is raised to a power denoted by an integral, positive or negative exponent.

More specifically, the invention consists in a computing device comprising a board perforated with holes for the reception of pegs and in the provision of a longitudinally movable slide mounted in a slot in the surface of the board and containing holes for the reception of pegs, the board being divided by horizontal, transverse and diagonal lines with peg receiving holes at the points of intersection.

The invention consists further in various details of construction of the device, combination and arrangements of parts which will be hereinafter fully described, shown in the accompanying drawings and then specifically defined in the appended claims.

In the drawings I have shown in Figures 1, 2 and 4 plan views of the board in which the numbers are some of the exponents used.

Figure 6:
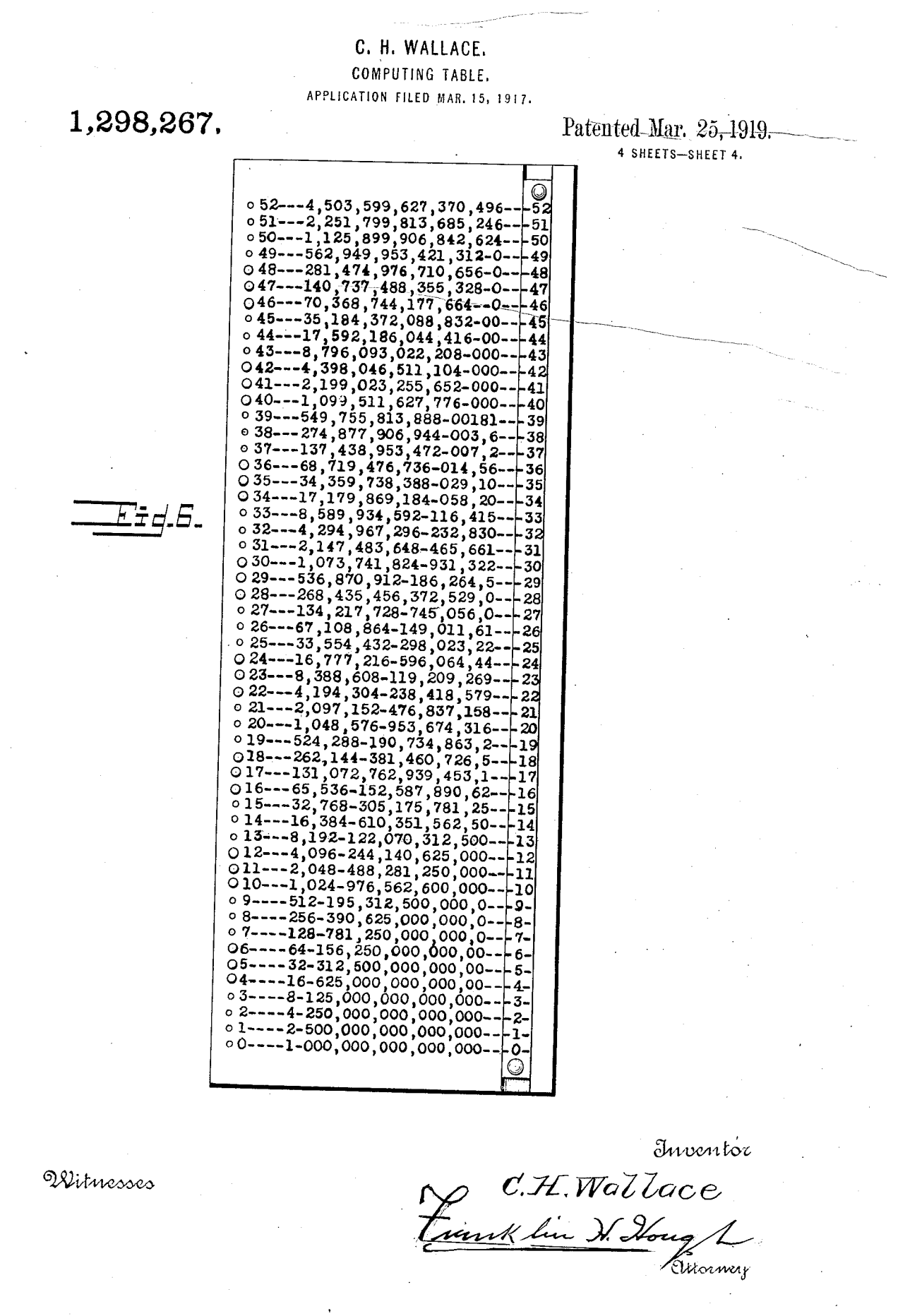

Figs. 5 and 6 are plan views showing tables of figures.

Figure 4:
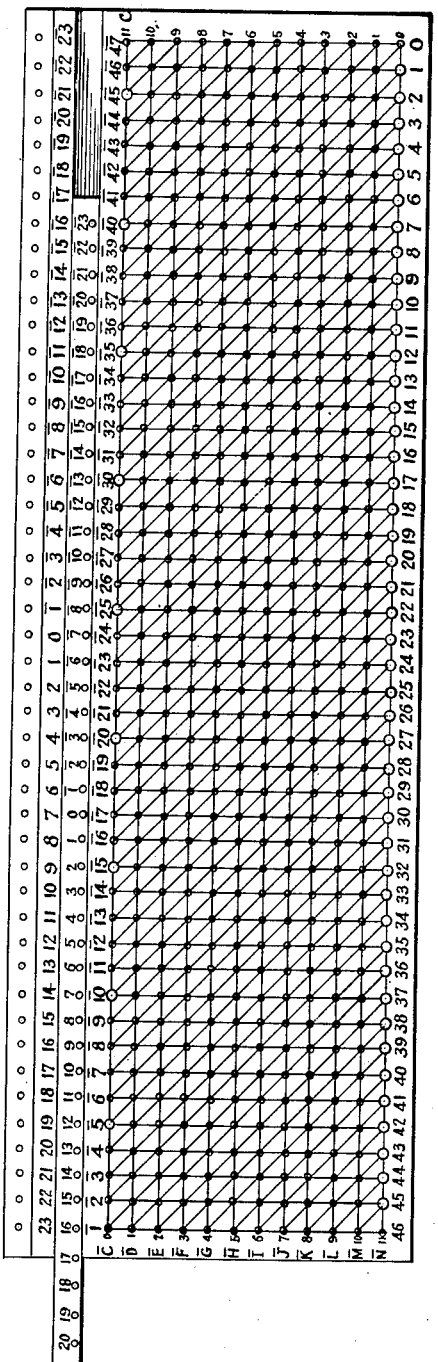
Figure 3:
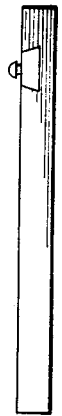
Fig. 3 is an end view of the board and slide.

It is well known that any number may be expressed as the sum of the powers of 2. This is the fundamental purpose in the theory of numbers and is well known to one skilled in the art. Thus, taking any number, such as, for example, 25. This number is equal to the sum of 16 which is the fourth power of 2 plus 8 which is the third power of 2 plus 1 which is the 0 power of 2. For example: If it is desired to multiply two such numbers as 66 and 31, it is to be noted that 66 is equal to 64 plus 2 or the sixth power of 2 plus the first power of 2. Similarly 31 is equal to $16+8+4+2+2$ which expressed in powers of 2 is $5+4+3+2+1+0$. These two numbers can accordingly be expressed as the sum of the finite series of powers of 2, as above clearly pointed out. We may then entirely disregard the modulus 2, $66=6 \times 11$, and $31=2+5+4+3+1+0$. These may be multiplied in the manner analogous to the use of logarithms:

$$5+4+3+2+1+0+$$
$$6+1$$

$$11+10+9+8+7+6+5+4+3+2+1+0$$

Figure 5:
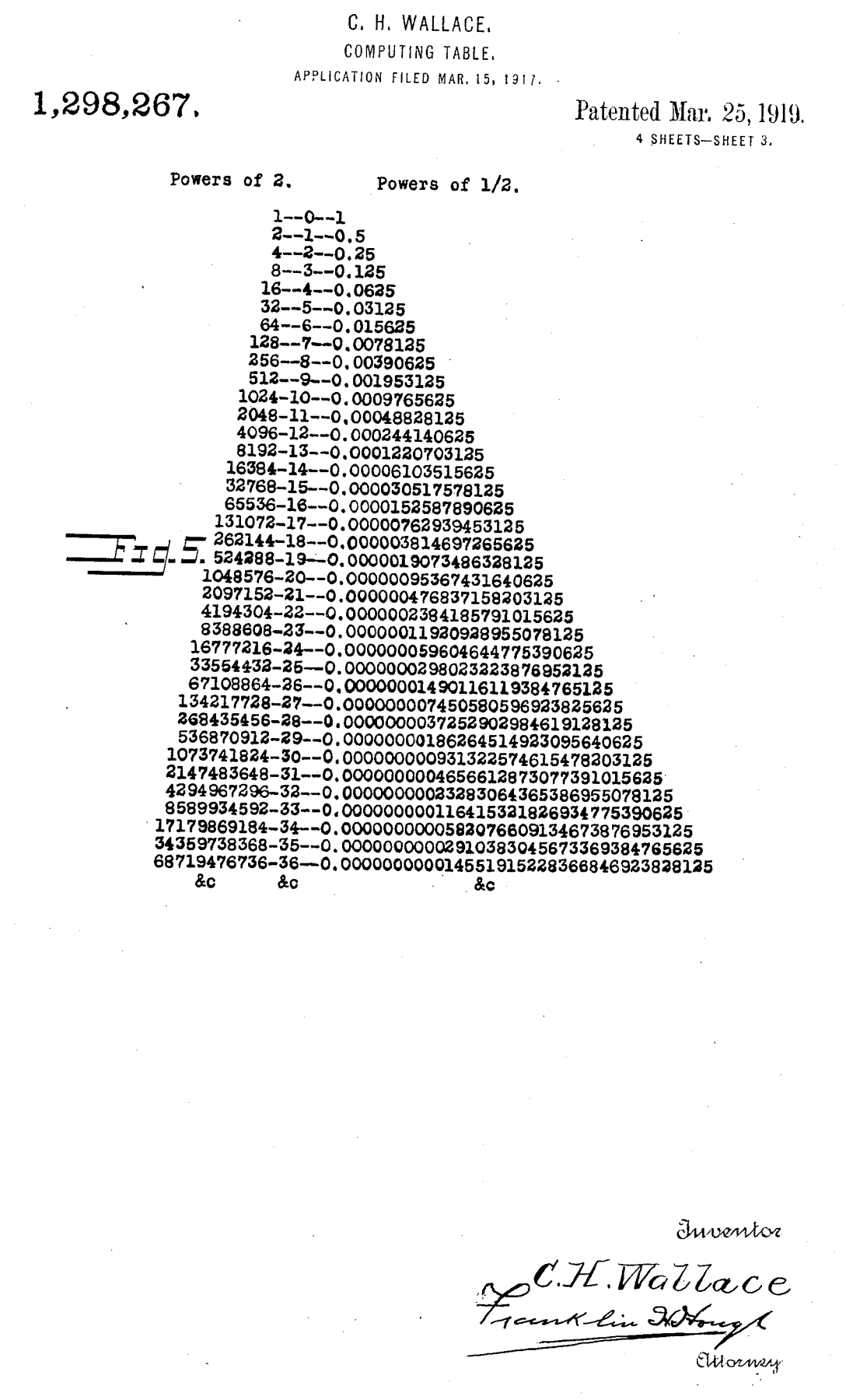

It is to be understood that each of these numbers of the product may be an exponent of 2. Accordingly the product is the 11th power of $2+2^{10}+$ etc. Referring to Fig. 5 it is found that this product is the sum of 1024, 512, 256, 128, 64, 32, 16, 8, 4, 2, 1, the sum of which is 2046, which, as will be noted is the actual product of $66 \times 31$.

Referring to Fig. 1 insert: Specifically the invention consists of a computing device comprising a board perforated with holes for the reception of pegs and in the provision of a longitudinally movable slide mounted in a slot in the surface of the board and containing holes for the reception of pegs, the board being divided by horizontal, transverse and diagonal lines with peg receiving holes at the points of intersection.

If now we set the numbers 4, 3, 2, 1, and 0 by means of pegs in the right hand side of the board in Fig. 1 in column R at the points designated by the numerals 4, 3, 2, 1, 0, as clearly illustrated, likewise place on the lower row the pegs $M'$ and $M^6$ in holes 1 to 6 respectively. In multiplying as above noted the exponents are added. This may be done graphically by the following process: Beginning with peg $M^0$ following along the horizontal line on which said peg occurs until peg $M'$ is reached, since zero will not augment this sum the peg 1 remains in its former position. Continuing on until the peg 6 is reached this same peg will remain in the same position for again the sum is not augmented. Then take exponent one, follow along the horizontal line in which this peg occurs until the intersection of the left diagonal with peg $M'$ is reached, place the peg P² in the hole therein. Continue along the same line until the corresponding diagonal for peg M⁶ is reached and place a peg P⁷ in the hole. Following down along the vertical line of peg P² it is found that this is directly above exponent 2 on the lower line which is of course the sum of 1—1 or 2². Likewise, P⁷ occurs above the numeral 7 and is 6—1.

Likewise, following along the horizontal line of peg 2 until the diagonal M' is reached insert the peg P³. It is to be noted that this above numeral 3 is the sum of 2—1 or 2³. Likewise the peg P⁸ is placed in a corresponding position with respect to M⁶. In a similar manner pegs P⁴ and P⁹ are placed with respect to M' and M⁶. Similarly for pegs P⁵ and P¹⁰. It is now to be noted that pegs occur in this board at positions above numerals 10, 9, 8, 7, 6, 5, 4, 3, 2, 1, 0. It is to be noted that the numbers on the lower line of Fig. 1 correspond in position with respect to the powers exhibited on the lower line thereof to the powers of 2 given in the products above noted. Thus we are able to accomplish multiplication with the device herein described.

Suppose it is desired to multiply two numbers such as 1023, which may be readily found to be 9+8+7+6+5+4+3+2+1+0 and 873, which may be found to be 9+8+6+5+3+0. Referring to Fig. 2 it is to be noted that the first number 9—8—7—6—5—4—3—2—1—0 that is set up by means of pegs on line R and the second number is set up on the horizontal line at the points 9—8—6—5—3—0. We proceed as before and the location of the pegs designated by larger circles is as indicated in said Fig. 2. It is to be noted that some of the lines as measured from the longitudinal line contain more than one peg in contrast to the first example. In order to avoid multiplication in any line where two pegs occur, such as for example in line 9, both these pegs may be removed and one placed in line 10, for it is to be noted that the number represented by line 10 is twice the number represented by line 9. In this way, by moving two pegs some one number will substitute one number in the next higher and we are able to multiply without partial products. If we continue in this way to eliminate the pegs according to the following schedule: Two pegs are found in line 3, remove them and place one in line 4. None are left:

| pegs are found in line |   | remove them and place | in line |   | are left. |
|---|---|---|---|---|---|
| 2 | 3 | 1 | 4 | 0 |  |
| 3 | 4 | 1 | 5 | 1 |  |
| 4 | 5 | 2 | 6 | 0 |  |
| 6 | 6 | 3 | 7 | 0 |  |
| 7 | 7 | 3 | 8 | 1 |  |
| 8 | 8 | 4 | 9 | 0 |  |
| 10 | 9 | 5 | 10 | 0 |  |
| 10 | 10 | 5 | 11 | 0 |  |
| 10 | 11 | 5 | 12 | 0 |  |
| 10 | 12 | 5 | 13 | 0 |  |
| 9 | 13 | 4 | 14 | 1 |  |
| 8 | 14 | 4 | 15 | 0 |  |
| 7 | 15 | 3 | 16 | 1 |  |
| 5 | 16 | 2 | 17 | 1 |  |
| 4 | 17 | 2 | 18 | 0 |  |
| 3 | 18 | 1 | 19 | 1 |  |
| 1 | 19 | 0 | 20 | 0 |  | and none higher.

The result is accordingly found to be 19+18+16+15+13+7+4+2+1+0. The remaining pegs as found from the above schedule may be placed in the upper row in Fig. 2 as is indicated by the circles on said row. Thus it is seen that any problem of multiplication may be readily accomplished by the herein described method. Suppose one of the numbers in the above multiplication were a reciprocal then the product of any other number with that reciprocal would be the quotient of the number divided by the number which corresponds to the reciprocal. Thus if $r$ is the reciprocal of some number $n$ the product of the reciprocal with any number $m$ the product $mr$, but it is to be remembered the $r$ is $\frac{1}{m}$ and the resultant product is really $\frac{m}{n}$ or the quotient, thus it is seen that division may be accomplished by the device herein described with the aid of a table of reciprocals.

Another method of dividing is as follows: Suppose you have any divisor which is one less than a power of 2, the reciprocal of such a number may be expanded into a definite power series of which the first term is the reciprocal of the next higher power of 2, the second the zero thereof, the third term the cube thereof and so forth. Take for example the number 31 which is noted to be 32−1. $\frac{1}{31}$ may accordingly be written $\frac{1}{32} + (\frac{1}{32})^2 + (\frac{1}{32})^3 + (\frac{1}{32})^4 +$ and so forth. Such a number may be represented on the board as follows: For $\frac{1}{32}$ is the negative fifth power of 2, or in other words, the fifth power of $\frac{1}{2}$. Placing the peg in the hole $\frac{1}{5}$ this peg will represent the fraction $\frac{1}{32}$. One of $(\frac{1}{32})^2$ is the negative tenth power of 2 or the tenth power of $\frac{1}{2}$. This term of the series is represented by the hole $\frac{1}{10}$, likewise the third term of the series is represented by the hole $\frac{1}{15}$ and so forth. Again we have a reciprocal resolved in powers of 2, and this reciprocal may be multiplied with any desired number whatever with the same process as above outlined for the multiplication of integral numbers. It is, however, to be noted that these powers are negative instead of positive and in the addition of these powers to those of any multiplication it is necessary to proceed along the left hand diagonal instead of the right as is clear to one skilled in the art. It is to be noted that only a few terms of this reciprocal have been considered for time is too limited to consider more. A few terms are sufficient to give results for all practical purposes. It is of course understood that if desired, more terms may be taken and a correspondingly more accurate result obtained.

We can also divide directly when the divisor is an integral power of 2 for setting up such a number on the negative scale as above we have only one exponent to deal with and multiplying (which is no more than dividing when the negative quotient is considered) we proceed as before and thereby obtain a quotient.

What I claim to be new is:—

1. As a means to facilitate calculating, a device which graphically or mechanically gives the numbers in the form of the integral exponents of a geometrical series of powers of 2, said series expressing any desired numbers the sum of which powers will give a series which is the product of the numbers so expressed.

2. As a means to facilitate calculating, a device which graphically or mechanically gives the numbers in the form of the integral exponents of a geometrical series of powers of 2, said series being capable of expressing any desired number the difference of which powers will give the quotient of the numbers expressed as a series.

3. In a device of the class described, means for graphically or mechanically representing any number as a geometrical series of the powers of 2 by means of locations predetermined by the series.

4. A computing device comprising a board divided by transverse, horizontal and diagonal lines with peg holes at intersections of the line, a transversely movable slide mounted in a slot in the board and having peg holes identified by numerals increasing in regular order in opposite directions, the horizontal lines of peg holes being designated from left to right by numerals from 1 upward, the peg holes at the bottom being designated by numerals in reverse order, the horizontal lines being designated at the left by numerals from 1 to 11 consecutively and the horizontal lines at the right of the board being identified by reversely arranged numerals from 11 to zero.

In testimony whereof I hereunto affix my signature in presence of two witnesses.

CLARENCE H. WALLACE.

Witnesses:
A. N. BELL,
JOS. GALEWSKY.